United States Patent [19]

Jones

[11] 4,253,119

[45] Feb. 24, 1981

[54] INTERFACE SYSTEM FOR SURFACE WAVE INTEGRATABLE FILTER

[75] Inventor: Gary A. Jones, Arlington Heights, Ill.

[73] Assignee: Zenith Radio Corporation, Glenview, Ill.

[21] Appl. No.: 79,611

[22] Filed: Sep. 27, 1979

[51] Int. Cl.³ ............................................. H04N 5/48
[52] U.S. Cl. .................................... 358/188; 333/194
[58] Field of Search ................ 358/188, 905; 333/151, 333/187, 193, 194; 329/167, 198; 330/174; 307/213

[56] References Cited

U.S. PATENT DOCUMENTS

| 3,626,309 | 12/1971 | Knowles | 333/151 |
|---|---|---|---|
| 3,714,594 | 1/1973 | Adler | 358/188 |
| 3,737,785 | 6/1973 | Korpel | 358/188 |
| 4,060,833 | 11/1977 | Onyshkevych | 358/188 |
| 4,063,202 | 12/1977 | Vasile | 333/194 |
| 4,065,789 | 12/1977 | DeVries | 333/194 |
| 4,126,838 | 11/1978 | McCusker | 333/194 |

OTHER PUBLICATIONS

Surface Accoustic-Wave Filter for Television Intermediate Freq., Van Raalte, RCA-Engineer-Jun.-Jul. 1974, vol. 70, No. 1, pp. 15-19.

Primary Examiner—Robert L. Griffin
Assistant Examiner—Michael A. Masinick
Attorney, Agent, or Firm—Zenith Radio Corporation

[57] ABSTRACT

A system is described for interfacing a SWIF with a tuner and an amplifier in the IF section of a television receiver. In the preferred arrangement, the tuner is coupled to the input of the SWIF so as to efficiently transfer signal power to the SWIF over the frequency range of the tuner's output. The output of the SWIF is coupled to an amplifier which has a low, untuned input impedance to establish a mismatch between the SWIF and the amplifier to therey reduce triple-transit effects associated with the SWIF. Preferably, the amplifier is a common-base amplifier whose input impedance is defined by a real impedance component which is substantially smaller in magnitude than its reactive impedance component. Hence, the real component of the amplifier's input impedance is dominant and the effects of stray capacitance between the SWIF and the amplifier are reduced.

6 Claims, 4 Drawing Figures

INTERFACE SYSTEM FOR SURFACE WAVE INTEGRATABLE FILTER

BACKGROUND OF THE INVENTION

The invention is directed generally to improvements in television receivers, and particularly to a system in the IF (intermediate frequency) section of a television receiver for interfacing a SWIF (Surface Wave Integratable Filter) with a tuner and IF amplifier.

A SWIF is essentially a device which converts signal energy to and from acoustic surface waves by means of transducers associated with the input and output terminals of the SWIF. The construction of the transducers themselves enables the frequency response of the SWIF to be tailored to a particular application. Hence, in television receivers, a SWIF may be employed as an IF filter. See U.S. Pat. No. 3,626,309, for example. Because a SWIF has a substantial insertion loss, the IF stage has an IF amplifier or gain block which boosts the IF signal after passage through the SWIF. Thus the SWIF is situated in the IF section between the tuner and the IF amplifier.

To interface a SWIF with a television system, attention must be paid to the so-called triple-transit effect which is common to SWIFs. This effect occurs because surface waves which are launched from the SWIF's input transducer reflect from its output transducer back toward the input transducer, which then reflect back off the input transducer and are received by the output transducer, resulting in a spurious image or "ghost" following the main image. To eliminate or tolerably reduce such reflections, the input and/or the output of the SWIF must be impedance mismatched. In this manner, the reflected waves are absorbed at the point of mismatch and the ghost effect on the reproduced television image is suppressed.

The need to suppress triple-transit reflections by impedance mismatching the input end of the SWIF with the tuner and/or the output end of the SWIF with the IF amplifier clashes with the desire to optimize power transfer into and out of the SWIF by impedance matching the SWIF with the tuner and IF amplifier. As will become evident below, this invention is directed to an improved way to comprise these directly conflicting objectives.

The prior art approaches have been to introduce an impedance mismatch at the input end of the SWIF between the SWIF and the tuner, or alternatively at the output end of the SWIF between the SWIF and the IF amplifier.

In the prior art, the most common way to achieve the impedance mismatch (and thus triple-transit reflection suppression) has been to drive the SWIF from a tuner which has a low output impedance. Because a SWIF has a high input impedance, a mismatch is created at the input to the SWIF, thereby substantially reducing the triple-transit-reflection effect. However, a significant power loss results from such a mismatch.

To avoid losing further power, the output of the SWIF has been coupled to an amplifier designed to provide a high input impedance, such as a common emitter amplifier. Thus, maximum power transfer between the SWIF and the amplifier was thought to have been obtained. It has been found, however, that the supposedly high input impedance of the amplifier is substantially reduced by the effects of stray capacitance at the interface between the amplifier and the SWIF. Consequently, the actual input impedance to the amplifier has been much lower than supposed (and desired), resulting in an additional power loss. It is known that this loss can be reduced by using a coil to tune out the stray capacitance at the SWIF-amplifier interface, but this results in a tuned-input, tuned-output amplifier configuration which is difficult to stabilize at maximum gain.

Another approach involves using a tuner with an output impedance matched to the input impedance of the SWIF (both high). The IF amplifier has a high input impedance; impedance matching network such as a pi filter is inserted between the SWIF and the amplifier. The impedance matching network has a low input impedance mismatched to the SWIF and a high output impedance matched to the input impedance of the amplifier. This approach suffers from its requirement for non-integratable external components (the inductive and capacitive components of the impedance-matching network).

For the reasons stated above, prior approaches of interfacing a SWIF with the IF section of a television receiver have been less than perfectly satisfactory, either from a cost or power-loss standpoint.

OBJECTS OF THE INVENTION

It is a general object of the invention to provide an improved system for interfacing a SWIF with the IF section of a television receiver which yields an optimum trade-off between triple-transit-reflection suppression and SWIF insertion loss.

It is a more specific object of the invention to provide such an interfacing system which reduces power loss.

It is yet another object of the invention to provide a low-loss interfacing system which requires no components external to the SWIF or integrated circuit amplifier.

BRIEF DESCRIPTION OF THE FIGURES

The objects stated above and other objects of the invention are set forth with more particularity in the following detailed description and in the accompanying drawings, of which.

DESCRIPTION OF THE PREFERRED EMBODIMENT

Figure 1:
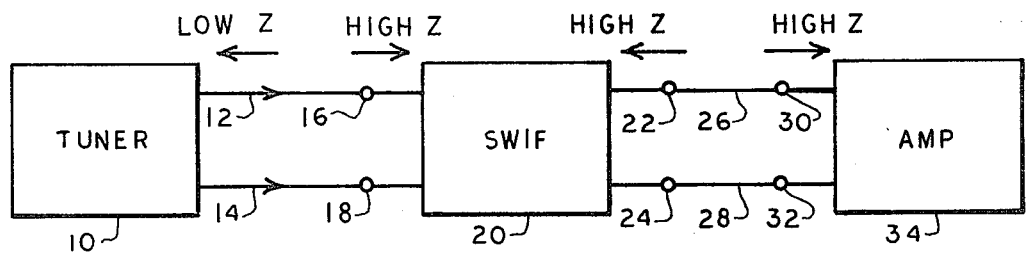
FIG. 1 is a block diagram illustrating a prior art arrangement for interfacing a SWIF with a tuner and an amplifier.

As stated above, television IF sections which incorporate a SWIF usually include an impedance mismatch between the SWIF and the tuner. The interface between the output of the SWIF and the input of the amplifier which follows the SWIF is usually designed as an impedance match. FIG. 1 illustrates such an arrangement.

As shown, the differential output of a tuner 10 is coupled via leads 12 and 14 to the input terminals 16 and 18 of a SWIF 20. As is customary, the SWIF 20 presents a relatively high input impedance to the tuner at terminals 16 and 18. To establish an impedance mismatch between the tuner 10 and the SWIF 20, the output impedance of the tuner is designed to be substantially lower than the input impedance of the SWIF. Although such a mismatch reduces the transfer of signal power between the tuner and the SWIF, the triple-transit effects associated with the SWIF are reduced.

The output of the SWIF 20 appears at terminals 22 and 24 and is coupled differentially via leads 26 and 28 to the input terminals 30 and 32 of an amplifier 34. Because the output impedance of the SWIF is relatively high at terminals 22 and 24, the impedance "looking into" terminals 30 and 32 of the amplifier 34 is also designed to be high, as by employing a common-emitter amplifier at the input stage of the amplifier 34. Such an impedance match between the SWIF 20 and the amplifier 34 tends to maximize the transfer of signal power from the SWIF to the amplifier.

Although the arrangement shown in FIG. 1 is conceptually sound, in practice it has been found to be unexpectedly inefficient for transferring signal power between the SWIF and the amplifier 34. That is, the so-called "insertion loss" has been much higher than predicted.

Specifically, it has been found that a relatively high level of stray capacity frequently exists at the input terminals 30 and 32 of the amplifier 34. Consequently, the input impedance of the amplifier 34 is substantially reduced, mismatch between the SWIF and the amplifier 34 occurs and the transfer of signal power to the amplifier 34 is substantially reduced.

Figure 2:
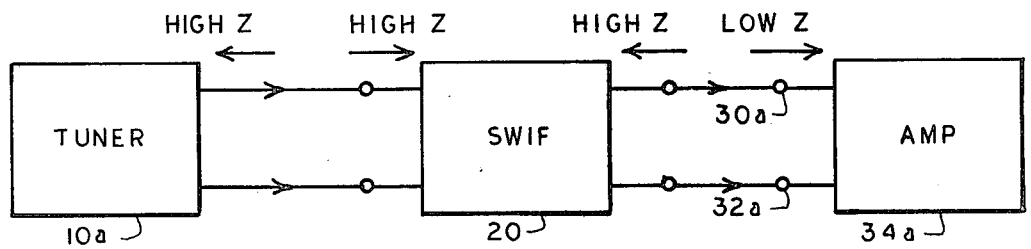
FIG. 2 is a block diagram illustrating another arrangement for interfacing a SWIF with a tuner and an amplifier.

To overcome the unexpectedly high insertion loss associated with the arrangement of FIG. 1, it has been proposed to tune out the stray capacitance associated with the amplifier, create a deliberate mismatch between the amplifier and the SWIF, and employ an impedance match between the tuner and the SWIF. Such an arrangement is shown in FIG. 2.

In this latter system, the tuner 10a is designed to present a high output impedance to the SWIF 20, thereby creating an impedance match with the SWIF for maximum power transfer. At the output of the SWIF, an impedance mismatch is effected with the amplifier 34a by providing the latter amplifier with a high input impedance tuning the amplifier's input with an impedance matching network (not shown). This arrangement compensates for stray capacity at the input of the amplifier 34a and reduces the triple-transit effects of the SWIF. However, the use of external coil and capacitors to tune out stray capacity is undesirable in applications where the amplifier is part of an integrated circuit.

To overcome the problems described above, the present system employs a tuner whose output impedance is designed to efficiently transfer power to the SWIF over the frequency range of interest. To receive the output of the SWIF, an amplifier with an untuned input is included whose input impedance is substantially lower than the output impedance of the SWIF so as to establish a mismatch between the amplifier and the SWIF. The effects of stray capacity are substantially eliminated by causing the real component of the amplifier's input impedance to be substantially lower than its reactive component, thereby rendering the real component dominant.

Figure 3:
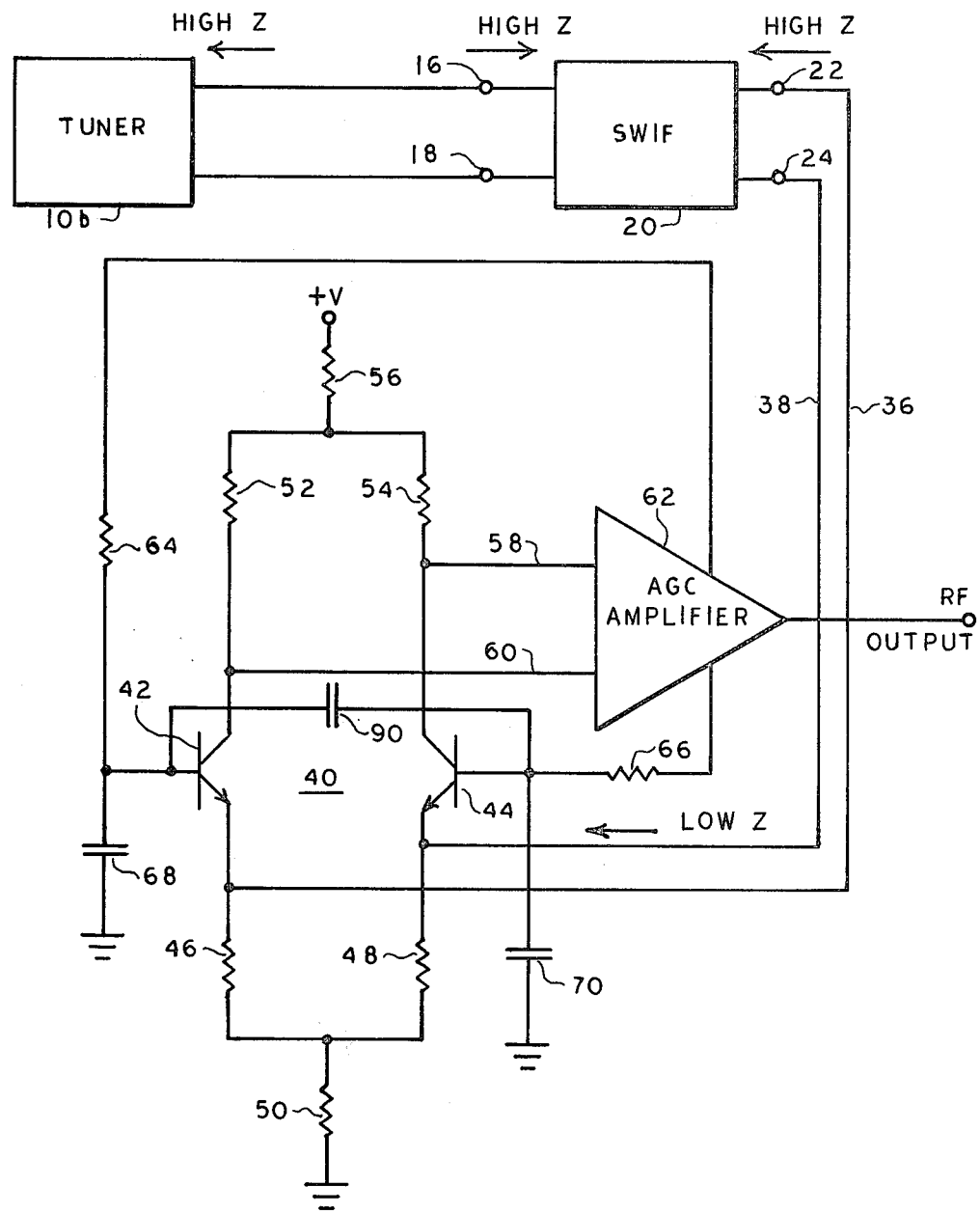
FIG. 3 depicts an interfacing system according to the invention and a preferred amplifier for use therein.

Referring now to FIG. 3, the preferred embodiment of a SWIF interfacing system is shown, including a preferred embodiment of an untuned input amplifier, as shown, the tuner 10b may be designed to present a high output impedance to the SWIF 20 to thereby provide a match between the tuner and the SWIF and to provide maximum transfer of signal power.

The differential output of the SWIF 20 is coupled via leads 36 and 38 to an untuned amplifier 40 which, as shown, includes transistors 42 and 44 connected in a common-base configuration. In the illustrated configuration, the emitters of the transistors 42 and 44 are coupled via resistors 46 and 48, respectively, to a common grounded resistor 50. The latter is essentially a decoupling resistor for cancelling differential signal currents.

The emitter of the transistor 42 receives the signal on lead 36 and amplifies it to an increased voltage level across a load resistor 52. Likewise, the emitter of the transistor 44 receives the signal on lead 38 and amplifies it to an increased voltage level across another load resistor 54. The two load resistors are coupled to a further resistor 56 whose opposite end receives a voltage source. Thus, the resistor 56 decouples signal current from the voltage source.

The output of the amplifier 40 is coupled via leads 58 and 60 to the input of an AGC (automatic gain controlled) amplifier 62 for further amplification of the signals and for controlling their amplitude. The amplifier 62 may be the conventional type commonly found in television receivers.

To bias the transistors 42 and 44 in a stable manner, their bases may be coupled via resistors 64 and 66, respectively, to conventional bias points in the amplifier 62 so as to create a negative feedback loop for stabilizing the operating point of the amplifier. In addition, an AC ground is established at the base of the transistors 42 and 44 by grounded capacitors 68 and 70 and/or differential capacitor 90.

With the illustrated arrangement, the emitters of the transistors 42 and 44 provide a low input impedance to the SWIF 20, thereby creating a mismatch between the SWIF and the amplifier 40 for reducing the triple-transit-reflections in the SWIF. Moreover, the common-base arrangement shown ensures that the real component of the amplifier's input impedance is approximately fifty ohms and is substantially smaller in magnitude than its reactive component. Consequently, the real component is dominant and substantially nullifies the effect of any stray capacity which may exist at the input to the amplifier.

To provide the desired input impedance, the transistors 42 and 44 are designed such that their base resistance is in the order of from fifty to one hundred ohms. At these values of base resistance, the transistor's input impedance becomes somewhat inductive and thereby cancels out some stray capacity at the input of the amplifier.

Figure 4:
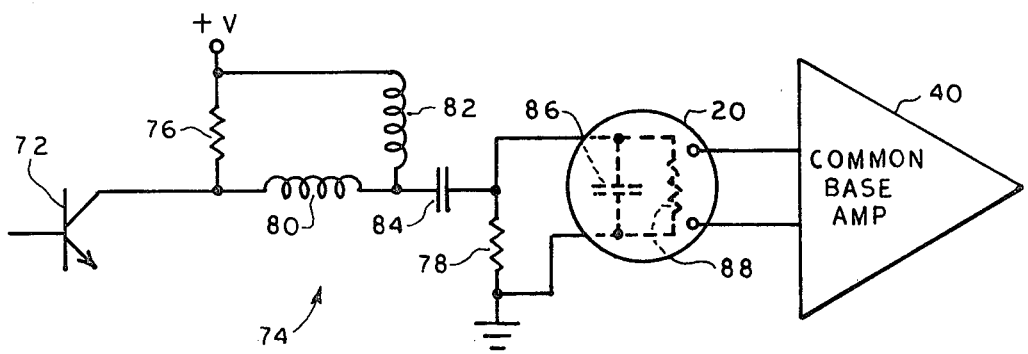
FIG. 4 is a circuit diagram of a tuner-SWIF interface which may be employed in the system shown in FIG. 3.

FIG. 4 illustrates a preferred arrangement for coupling the tuner 10b to the SWIF. The illustrated arrangement couples the output from a tuner transistor 72 to the input of the SWIF 20 via a coupling network 74. The network 74 includes resistors 76 and 78, coils 80 and 82, and a capacitor 84, all interconnected as shown.

The values of the various circuit elements in FIGS. 3 and 4 may have the illustrative values indicated in the table below.
Resistors (in ohms):
 46–1 k
 48–1 k
 50–1.3 k
 52–270

54–270
56–510
64–10 k
66–10 k
76–10 k
78–470

Capacitors (in picofarads):
68–1000
70–1000
84–1000
90–1000

Inductors (in microhenries):
80–6.5
82–1.0

The nature of the input impedance of the SWIF is indicated schematically by a capacitor 86 and resistance 88, both shown in dashed lines.

The system described above provides a SWIF interface which yields improved signal power transfer with a more than satisfactory noise figure, all without employing additional external components such as coils or transistors. Moreover, the amplifier is easily manufacturable in integrated circuit form because it requires but a pair of transistors and a few resistors.

Although the invention has been described with reference to a preferred structure, it will be obvious to those skilled in the art that many modifications and alterations thereto may be made without departing from the invention. Accordingly, it is intended that all such modifications and alterations be included within the spirit and scope of the invention as defined by the appended claims.

What is claimed is:

1. In a television receiver having a tuner and an IF section in which a SWIF in the IF section filters the output of the tuner, a totally integratable system for interfacing the SWIF with an amplifier in the IF section which provides an optimum trade-off between triple-transit reflection suppression in the SWIF and SWIF insertion loss and which comprises:
   means for coupling the tuner to the SWIF so as to efficiently transfer signal power from the tuner to the SWIF; and
   an integrated circuit amplifier with an untuned input receiving the output of the SWIF, said amplifier having an input impedance whose magnitude is substantially lower than the output impedance of the SWIF to establish an impedance mismatch therebetween such that triple-transit-reflection effects commonly associated with the SWIF are reduced by the mismatch between the amplifier and the SWIF while achieving a maximum usable power transfer from the tuner to said amplifier.

2. A system as set forth in claim 1 wherein the input impedance of said amplifier has a real component and a reactive component, and wherein said real component is designed to be substantially lower in magnitude than the reactive component,
   whereby the real component of the input impedance of said amplifier is dominant and the effects of stray capacitance between the SWIF and said amplifier are reduced.

3. A system as set forth in claim 2 wherein said amplifier includes a pair of transistors connected in a common-base configuration and being driven differentially by the SWIF.

4. In a television receiver having a tuner with a high output impedance and an IF section in which a SWIF in the IF section with high input and output impedances filters the output of the tuner, a totally integratable system for interfacing the SWIF with the IF section which provides an optimum trade-off between triple-transit-reflection suppression in the SWIF and SWIF insertion loss and which comprises:
   means for coupling the tuner to the SWIF so as to efficiently transfer signal power from the tuner to the SWIF; and
   a common-base amplifier receiving the output of the SWIF, said amplifier having an input impedance whose magnitude is substantially lower than the output impedance of the SWIF and whose real impedance component is substantially lower in magnitude than its reactive impedance component.

5. A system as set forth in claim 4 wherein said amplifier includes a pair of transistors connected in a common-base configuration and differentially driven by the SWIF.

6. In a television receiver having a tuner, a SWIF for filtering the output of the tuner, and an amplifier receiving the output of the SWIF, an improved amplifier therefor, comprising:
   a pair of untuned transistors connected in a common base configuration and differentially driven by the SWIF, each of said transistors having an input impedance whose magnitude is substantially lower than the output impedance of the SWIF, and such that the real component of the amplifier's input impedance is substantially lower in magnitude than its reactive component.

* * * * *